United States Patent
Ochiai

(10) Patent No.: US 9,447,730 B2
(45) Date of Patent: Sep. 20, 2016

(54) PURGE METHOD AND PURGE UNIT FOR GAS TURBINE COMBUSTOR

(71) Applicant: MITSUBISHI HEAVY INDUSTRIES, LTD., Tokyo (JP)

(72) Inventor: Yoshiaki Ochiai, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 544 days.

(21) Appl. No.: 13/755,447

(22) Filed: Jan. 31, 2013

(65) Prior Publication Data

US 2013/0291547 A1 Nov. 7, 2013

(30) Foreign Application Priority Data

May 2, 2012 (JP) .................................. 2012-105016

(51) Int. Cl.
  F02C 7/232 (2006.01)
  F02C 7/00 (2006.01)
  F02C 9/40 (2006.01)
(52) U.S. Cl.
  CPC ................. F02C 7/00 (2013.01); F02C 7/232 (2013.01); F02C 9/40 (2013.01)
(58) Field of Classification Search
  CPC ........ F01K 21/04; F01K 21/047; F02C 3/30; F02C 7/232; F01D 21/00; F23R 3/286; F23R 3/343
  See application file for complete search history.

(56) References Cited

U.S. PATENT DOCUMENTS 5,720,164 A    2/1998  Corbett et al.
5,784,875 A *  7/1998  Statler ............................ 60/775
6,250,065 B1 * 6/2001  Mandai et al. ................. 60/776
2002/0026785 A1  3/2002  Nakamoto
2005/0193741 A1  9/2005  Iasillo et al.

(Continued)

FOREIGN PATENT DOCUMENTS

CN  101169074 A   4/2008
JP  H11-324715 A  11/1999

(Continued)

OTHER PUBLICATIONS

Notification of Transmittal of Translation of the International Preliminary Report on Patentabililty (Form PCT/IB/338) of International Application No. PCT/JP2013/062007 mailed Nov. 13, 2014 with Forms PCT/IB/373 and PCT/ISA/237, with translation. (14 pages).
International Search Report of PCT/JP2013/062007, date of mailing date Jul. 16, 2013.

(Continued)

Primary Examiner — Craig Kim
(74) Attorney, Agent, or Firm — Westerman, Hattori, Daniels & Adrian, LLP

(57) ABSTRACT

A purging method and a purge unit for a gas turbine combustor capable of effectively preventing deviation of an exhaust gas environmental regulation value from a regulation range in the case of using a dual-fuel type gas turbine combustor. The gas turbine combustor is provided with nozzles. Which communicate with an oil fuel line where oil fuel flows and a gas fuel line where gas fuel flows and are capable of switching injection fuel between the oil fuel and the gas fuel. A purging method for the gas turbine includes a first purge step of purging the oil fuel line by at least water immediately after the injection fuel is switched to the gas fuel from the oil fuel and a second purge step of purging the oil fuel line by at least water immediately before the injection fuel is switched to the oil fuel from the gas fuel.

9 Claims, 6 Drawing Sheets

(56) References Cited

U.S. PATENT DOCUMENTS

2013/0097991 A1* 4/2013 Zhang ................. F23K 5/06
60/39.59
2013/0098041 A1* 4/2013 Zhang et al. ............... 60/734

FOREIGN PATENT DOCUMENTS

| JP | H11-350978 A | 12/1999 |
| --- | --- | --- |
| JP | 2001-59427 A | 3/2001 |
| JP | 2002-138855 A | 5/2002 |
| JP | 2005-98243 A | 4/2005 |
| JP | 2007-327338 A | 12/2007 |
| JP | 4317628 B2 | 8/2009 |
| WO | 2011/026982 A1 | 3/2011 |

OTHER PUBLICATIONS

Office Action dated Jul. 31, 2015, issued in counterpart Chinese Patent Application No. 201380011041.4, with English translation (13 pages).

Notice of Allowance dated Jan. 18, 2016, issued in counterpart Korean Patent Application No. 10-2014-7026939. (2 pages). Concise English Language Explanation of Relevance: The Notice of Allowance effective Jan. 18, 2016, issued to the corresponding Korean Application No. 10-2014-7026939.

Notice of Allowance dated Mar. 29, 2016, issued in counterpart Chinese Patent Application No. 201380011041.4, with English translation. (6 pages).

Decision to Grant a Patent dated May 6, 2016, issued in counterpart Japanese Patent Application No. 2012-105016, with English translation. (6 pages).

* cited by examiner

PURGE METHOD AND PURGE UNIT FOR GAS TURBINE COMBUSTOR

TECHNICAL FIELD

The present invention relates to a purging method and a purge unit for a dual-fuel type gas turbine combustor provided with a nozzle capable of switching injection fuel between oil fuel and gas fuel.

BACKGROUND ART

To be compatible with a various types of fuel including liquid oil fuel such as fuel oil, diesel fuel and liquefied petroleum gas (LPG), and gas fuel such as natural gas and coal gas, a dual-fuel type gas turbine combustor capable of switching the fuel to be used between the oil fuel and the gas fuel has been known.

In a dual-fuel type gas turbine combustor, once the fuel to be used is switched to gas fuel from oil fuel, it is inevitable that the oil fuel remains in a passage (an oil fuel line) for introducing the oil fuel to a nozzle. This residual oil cokes from being exposed to a high temperature environment resulting from combustion of the gas fuel. This causes blockage of the nozzle. Even if the nozzle is not completely blocked, a fuel injection amount from the nozzle deviates from a desired value in some cases, which could result in generation of combustion oscillation, deviation of exhaust gas environmental regulation value (NOx amount, CO amount) from a regulation range, etc. Once there is failure such as blockage of the nozzle and the deviation from the desired value of the fuel injection amount, it is necessary to remove the nozzle where the failure took place to clean the nozzle. This requires the gas turbine to be shut down temporarily, missing a power generation opportunity.

Therefore, there is a purge technique proposed to drain residual oil from each system by purging a main oil fuel system and a pilot oil fuel system by water or gas in a time-sharing manner immediately after the fuel to be used is switched to gas fuel from oil fuel (e.g. Patent Literature 1).

It was thought that the above-mentioned failures caused by coking of the residual oil (blockage of the nozzle and deviation of the fuel injection amount from the desired value) could be prevented by the above purge technique, i.e. by purging immediately after the operation is switched to gas firing operation from oil firing operation so as to forcibly discharge the liquid oil fuel remaining in the oil fuel system (the residual oil prior to the coking).

CITATION LIST

Patent Literature

[PTL 1]
JP 4317628 B

SUMMARY

Technical Problem

In recent years, environmental regulations are becoming stricter and in the case of using the dual-fuel type gas turbine combustor, the issue of deviation of the exhaust gas environmental regulation value from the regulation range is becoming more evident.

The present inventors have made studies on the cause of deviation of the exhaust gas environmental regulation value from the regulation range which occasionally happens in the gas turbine equipped with the dual-fuel type gas turbine combustor. As the result, the inventors found that, contrary to the conventional perception, the purge technique described in Patent Literature 1 does not always remove the residual oil completely from the oil fuel line. Described below are possible reasons why the residual oil in the oil fuel line cannot be completely removed, even by purging the oil fuel line by water or air immediately after the operation is switched to the gas firing operation from the oil firing operation according to the purge technique of Patent Literature 1.

Specifically, even when most of the liquid oil fuel is discharged from the oil fuel line by purging the oil fuel line immediately after the operation is switched to the gas firing operation from the oil firing operation, at least some of the liquid oil fuel remains in a stagnation part of the flow in the oil fuel line (including an oil sump). And when there is residual fuel oil in the flow path even in a small amount, the residual fuel oil becomes exposed to the high temperature environment during the gas firing operation and starts turning into a high-viscosity substance (e.g. a gel-like substance formed when the residual fuel oil undergoes oxidation, deterioration, polymerization, desiccation, carbonization, etc.) immediately after the operation is switched to the gas firing operation. As this substance has high viscosity, even by purging the oil fuel line repeatedly by water or gas immediately after the operation is switched to the gas firing operation from the oil firing operation, it is difficult to completely remove this high-viscosity substance from the oil fuel line. Further, once the gas firing operation starts in this state, the high-viscosity substance having been exposed to the high temperature environment for a long period of time becomes dry and turns into a solidified matter (or semi-solidified matter). Once the operation is switched back to the oil firing operation, failure of the fuel injection from the nozzle occurs, causing deviation of the exhaust gas environmental regulation value from the regulation range.

In view of the above issues, it is an object of the present invention to provide a purging method and a purge unit for a gas turbine combustor which is capable of effectively preventing deviation of the exhaust gas environmental regulation value from the regulation range in the case of using the dual-fuel type gas turbine combustor.

Solution to Problem

A purging method, according to the present invention, for a gas turbine combustor comprising a nozzle which communicates with an oil fuel line where oil fuel flows and a gas fuel line where gas fuel flows and which can switch injection fuel between the oil fuel and the gas fuel, comprises:

a first purge step of purging the oil fuel line by at least water immediately after the injection fuel is switched to the gas fuel from the oil fuel; and a second purge step of purging the oil fuel line by at least water immediately before the injection fuel is switched to the oil fuel from the gas fuel.

According to this purging method for the gas turbine combustor, most of the liquid oil fuel remaining in the oil fuel line is removed by performing the first purge step immediately after the injection fuel is switched to the gas fuel from the oil fuel. However, it is practically difficult to completely remove the oil fuel by the first purge step alone. For instance, at least a small amount of the oil fuel remains in a stagnation part of the flow in the oil fuel line. Further, the small amount of the oil fuel that could not be removed by the first purge step and remained in the oil fuel line is exposed to the high temperature environment immediately after the operation is switched to the gas firing operation and turns into a high-viscosity substance. It is difficult to remove the high-viscosity substance even by repeating the purge (the first purge step) in this state.

In contrast, at the time of performing the second purge step (immediately before the injection fuel is switched to the oil fuel from the gas fuel), the small amount of the high-viscosity substance has been already exposed to the high temperature environment caused by the gas firing operation for a long time and drying of the substance has already progressed to turn the high-viscosity substance into the solidified matter (or semi-solidified matter). Further, at this time, the oil fuel, which draws heat from the oil fuel line, has not streamed in the oil fuel line for a long time after switching the operation to the gas firing operation. Thus, the oil fuel line is already at high temperature not less than the boiling point of water. When the second purge step is started in this state, a part of purging water introduced to the oil fuel line of high temperature evaporates, generating water vapor in an initial stage of the second purge step. This water vapor causes the small amount of the high-viscosity substance turned into the solidified matter (or semi-solidified matter) to be lifted and separated from a wall surface inside the oil fuel line, and the separated solidified matter (or semi-solidified matter) is then discharged from the oil fuel line with the purging water introduced afterwards. In this process, the purging water (or water vapor) heated to high temperature by heat transfer from the heat retained by the oil fuel line contacts the high-viscosity substance turned into the solidified matter (or semi-solidified matter), thereby hydrolyzing the solidified matter (or semi-solidified matter). It is presumed that separation and discharge of the solidified matter (or semi-solidified matter) from the oil fuel line is promoted in this manner.

By combining the first purge step and the second purge step of two different purge mechanisms, it is possible to surely remove the residual oil from the oil fuel line and to effectively prevent deviation of the exhaust gas environmental regulation value from the regulation range.

At the time of performing the first purge step (i.e. immediately after the injection fuel is switched to the gas fuel from the oil fuel), the oil fuel was streaming in the oil fuel line until just before the first purge step and heat transfer was taking place from the oil fuel line to the oil fuel, and thus the temperature of the oil fuel line is not so high. Therefore, it is presumed that in the first purge step, unlike the second purge step, generation of the water vapor from the purging water and contact with the high temperature water or the water vapor cause little hydrolysis of the solidified matter (or semi-solidified matter).

The second purge step may be performed before the injection fuel is switched to the oil fuel from the gas fuel, in response to a preparation signal for switching the injection fuel to the oil fuel from the gas fuel.

As a result, by performing the second purge step at an appropriate timing immediately before the injection fuel is switched to the oil fuel from the gas fuel, it is possible to start the oil firing operation after removing the residual oil (solidified matter or semi-solidified matter) in the oil fuel line. Thus, deviation of the exhaust gas environmental regulation value from the regulation range can be effectively prevented.

In the above purging method for the gas turbine combustor, in the second purge step, water purging may be performed by supplying water to the oil fuel line and then gas purging may be performed by supplying gas to the oil fuel line, and the water purging and the gas purging may be completed before the injection fuel is switched to the oil fuel from the gas fuel.

By performing the water purging and the gas purging in this order in the second purge step, the residual oil (solidified matter or semi-solidified matter) in the oil fuel line can be removed by the water purging and then, the water remaining in the oil fuel line (the water which is used for purging the residual oil and is contaminated with the residual oil) can be discharged by the gas purging. Moreover, by completing the water purging and the gas purging before the injection fuel is switched to the oil fuel from the gas fuel, it is possible to start the oil firing operation in such a state that there is no purging water left in the oil fuel line. Thus, it is possible to prevent inhibition of stable combustion in the initial stage of the oil firing operation caused by the water remaining in the oil fuel line (the water used for purging the residual oil) being injected at once.

In the above purging method for the gas turbine combustor, the nozzle may include: a pilot nozzle which communicates with a pilot oil fuel line and a pilot gas fuel line and which can switch the injection fuel between the oil fuel and the gas fuel; and a plurality of main nozzles which is provided to surround the pilot nozzle, each of the plurality of main nozzles communicating with a main oil fuel line and a main gas fuel line and being configured to switch the injection fuel between the oil fuel and the gas fuel, the oil fuel line purged by the at least water in the first purge step and the second purge step may be the main oil fuel line communicating with each of the plurality of main nozzles, in the second purge step, water purging may be performed by supplying water to the main oil fuel line and then gas purging may be performed by supplying gas to the main oil fuel line, and when the gas fuel is selected as the injection fuel, only gas purging may be performed in the pilot oil fuel line by supplying gas to the pilot oil fuel line in a continuous manner.

The pilot nozzle, being surrounded by the plurality of main nozzles, tends to rise higher in temperature than the main nozzles and is particularly prone to coking of the residual oil. During the gas firing operation, coking of the residual oil can be prevented by performing the gas purging on the pilot nozzle in a continuous manner. By performing the gas purging in a continuous manner, a supply amount of the gas needed for purging increases. However, there is only one pilot nozzle and thus, the increase in the amount of the gas needed for purging is in an allowable range. On the other hand, there is more than one main nozzle and thus, if the gas purging is performed in a continuous manner for the main nozzles, the amount of the gas needed for purging becomes enormous. As a result, consumption energy of a compressor for supplying the purging gas increases, and in some cases a separate compressor exclusively for purging may be needed. Therefore, as described above, for the main nozzle which has lower temperature than the pilot nozzle and is less prone to coking, intermittent purge is performed by the first purge step and the second purge step, instead of continuously performing the gas purging. Thus, pilot nozzle and the main nozzles can be purged effectively while suppressing increase of the supply amount of the purging gas.

Further, the main nozzles may be divided into a plurality of groups, and the water purging in the second purge step may be started for the main oil fuel lines communicating with the plurality of main nozzles belonging to the groups at timings that differ according to the groups.

The purging water affects combustion stability to some degree. The stable combustion tends to be hindered particularly immediately after the water purging starts, which is when injection of the purging water from the main nozzle via the main oil fuel line suddenly starts. In view of this, instead of starting the water purging in the second purge step at the same time for all of the main oil fuel lines, the timings for starting the water purging are varied according to groups of the main nozzles. As a result, it is easier to maintain stable combustion.

Furthermore, when starting the water purging in the second purge step, an amount of the purging water supplied to the main oil fuel line communicating with the main nozzle belonging to each of the groups may be increased in a phased manner.

By increasing the amount of the purging water supplied to the main fuel line in a phased manner when the water purging is started in the second purge step, it is made easier to maintain stable combustion immediately after the water purging is started.

Moreover, while supplying the water for purging to the oil fuel line in the first purge step and the second purge step, a pilot ratio may be temporarily increased, the pilot ratio being a ratio of a flow of fuel injected from the pilot nozzle to an entire fuel flow.

By temporarily increasing the ratio (the pilot ratio) of the flow of the fuel injected from the pilot nozzle for diffusion combustion to the entire fuel flow while performing the water purging which possibly affects combustion stability, it is made easier to maintain combustion stability while performing the water purging.

In the above purging method for the gas turbine combustor, in the first purge step and the second purge step, an amount of the water supplied to the oil fuel line for purging may be set not greater than a flame extinction limit value in accordance with an output of a gas turbine.

In the amount of the purging water supplied for purging, there is the flame extinction limit value for maintaining stable combustion without causing flame extinction. This flame extinction limit value relies on the output of the gas turbine output. Thus, by setting the amount of water supplied in the water purging not greater than the flame extinction limit value in accordance with the output of the gas turbine, it is possible to select an appropriate amount of the water for the water purging in accordance with the output of the gas turbine within a range that does not interfere with stable combustion, thereby surely removing the residual oil from the oil fuel line. Further, from the perspective of achieving both the stable combustion and removal of the residual oil, the amount of water supplied during the water purging may be set, for instance, in a range from 0.5Fth or more to 0.98Fth or less (preferably 0.8Fth or more to 0.95Fth or less) where Fth is the flame extinction limit value.

A purge unit, according to the present invention, for a gas turbine combustor comprising a nozzle which communicates with an oil fuel line where oil fuel flows and a gas fuel line where gas fuel flows and which can switch injection fuel between the oil fuel and the gas fuel, further comprises:

a water tank for reserving water for purging;

a purging water supply path for communicating the water tank with the oil fuel line;

a purging water supply valve provided in the purging water supply path; and a controller for controlling opening and closing of the purging water supply valve, wherein the controller is configured to:

supply water to the oil fuel line from the water tank by opening the purging water supply valve in response to a signal for switching the injection fuel to the gas fuel from the oil fuel so as to perform a first purging of the oil fuel line immediately after the injection fuel is switched to the gas fuel; and supply water to the oil fuel line from the water tank by opening the purging water supply valve in response to a preparation signal for switching the injection fuel to the oil fuel from the gas fuel so as to perform a second purging of the oil fuel line immediately before the injection fuel is switched to the oil fuel from the gas fuel.

According to this purge unit for the gas turbine combustor, most of the liquid oil fuel remaining in the oil fuel line is removed by performing the first purge immediately after the injection fuel is switched to the gas fuel in response to the signal for switching the injection fuel to the gas fuel from the oil fuel. Further, by performing the second purge in response to the preparation signal for switching the injection fuel to the oil fuel from the gas fuel immediately before the injection fuel is switched to the oil fuel, it is possible to discharge the solidified matter (or semi-solidified matter) generated from a small amount of the residual oil failing to be removed by performing the first purge and being exposed to the high temperature environment of the gas firing operation for a long period of time. In this process, the purging water (or water vapor) heated to high temperature by heat transfer from the heat retained by the oil fuel line contacts the high-viscosity substance turned into the solidified matter (or semi-solidified matter), thereby hydrolyzing the solidified matter (or semi-solidified matter). It is presumed that separation and discharge of the solidified matter (or semi-solidified matter) from the oil fuel line is promoted in this manner.

By combining the first purge and the second purge of two different purge mechanisms in this manner, it is possible to surely remove the residual oil from the oil fuel line and to effectively prevent deviation of the exhaust gas environmental regulation value from the regulation range.

Advantageous Effects

According to the present invention, it is possible to effectively prevent deviation of the exhaust gas environmental regulation value from the regulation range by surely removing the residual oil from the oil fuel line by combining the first purge step of purging immediately after the fuel is switched to the gas fuel and the second purge step of purging immediately before the fuel is switched to the oil fuel.

DETAILED DESCRIPTION

An embodiment of the present invention will now be described in detail with reference to the accompanying drawings. It is intended, however, that unless particularly specified in these embodiments, dimensions, materials, and shapes of components, and their relative positions and the like shall be interpreted as illustrative only and not limitative of the scope of the present invention.

Hereinafter, described first is a structure of a gas turbine combustor, to which a purge unit and a purging method according to the embodiment of the present invention are applied, and next described is the purge unit and the purging method according to this embodiment.

Figure 1:
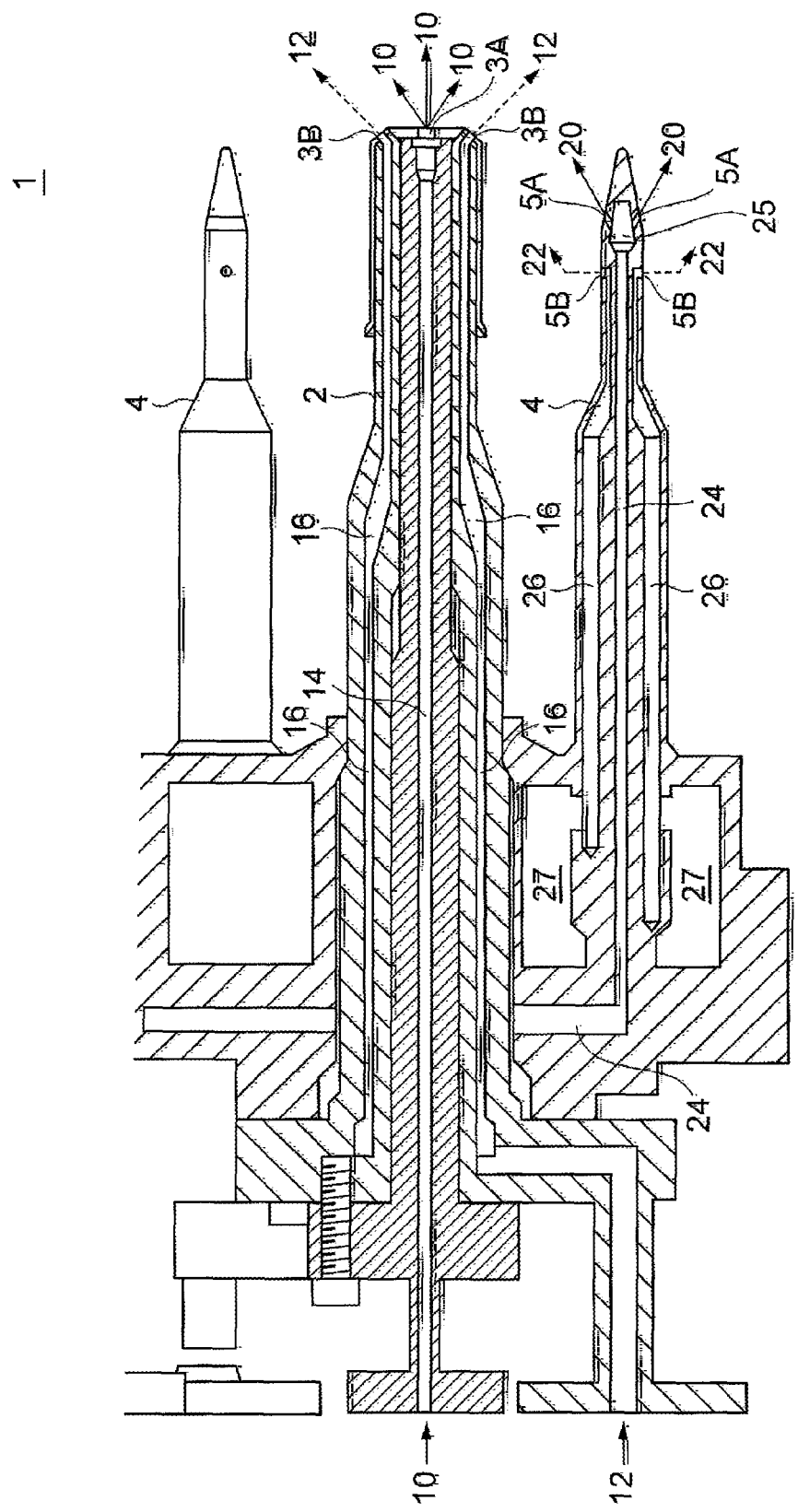
FIG. 1 is an illustration of an example structure of a dual-fuel type gas turbine combustor.

FIG. 1 is an illustration of an example structure of a dual-fuel type gas turbine combustor. As illustrated in the drawing, the gas turbine combustor 1 (hereinafter, simply referred to as "combustor 1") is configured by one pilot nozzle 2 and a plurality of main nozzles 4 (e.g. eight main nozzles) arranged around the pilot nozzle 2. The combustor 1 may be multi can type combustor having a plurality of cans for each gas turbine (e.g. twenty cans), or a single can type combustor having one can for each gas turbine.

The pilot nozzle 2 is configured so that one of pilot oil fuel 10 and pilot gas fuel 12 is selectively supplied to a tip of the pilot nozzle 2 via a pilot oil fuel line 14 or a pilot gas fuel line 16. Herein, the pilot oil fuel line 14 and the pilot gas fuel line 16 each indicate an overall fuel supply passage including an external passage provided outside the pilot nozzle 2 and communicating with a fuel supply unit and an internal passage (an oil fuel distribution passage) provided inside the pilot nozzle 2 and extending to injection ports 3A and 3B. The pilot oil fuel 10 passes through the pilot oil fuel line 14 and is injected from the injection port 3A provided at the tip of the pilot nozzle 2. The pilot gas fuel 12 passes through the pilot gas fuel line 16 provided around the pilot oil fuel line 14 and is injected from the injection port 3B provided at the tip of the pilot nozzle 2.

The pilot oil fuel 10 or the pilot gas fuel 12 injected from the injection port 3A or 3B of the pilot nozzle 2 is combusted using combustion air to form diffusion flame downstream of the injection ports 3A or 3B. Then, high-temperature combustion gas generated from the diffusion flame serves as a flame holding point of premixed flame by the main nozzle 4 which is described later. As described above, the pilot nozzle 2 contributes to stabilization of the premixed flame and thus, by increasing a ratio (a pilot ratio) of a flow of fuel injected from the pilot nozzle 2 to the entire fuel flow, overall combustion stability of the combustor 1 is improved.

The main nozzle 4 is configured so that one of main oil fuel 20 and main gas fuel 22 is selectively supplied to a tip of the main nozzle 4 via a main oil fuel line 24 or a main gas fuel line 26. Herein, the main oil fuel line 24 and the main gas fuel line 26 each indicate an overall fuel supply passages including an external passage provided outside the main nozzle 4 and communicating with a fuel supply unit, and an internal passage (an oil fuel distribution passage) provided inside the main nozzle 4 and extending to injection ports 5A and 5B. The main oil fuel 20 passes through the main oil fuel line 24 and is injected via an oil sump 25 from the injection port 5A provided at the tip of the main nozzle 4. The main gas fuel 22 passes through the main gas fuel line 26 including a gas sump 27 and is injected from the injection port 5B provided at the tip of the main nozzle 4.

The main oil fuel 20 or the main gas fuel 22 injected from the injection port 5A or 5B of the main nozzle 4 is premixed with combustion air (main air) to produce pre-mixed gas. This pre mixed gas is ignited and combusted by the high temperature combustion gas generated from the diffusion flame formed downstream of the injection ports 3A and 3B of the pilot nozzle 2 to form premixed flame. The main nozzle 4 is for forming the premixed flame by combusting the premixed gas and thus capable of reducing NOx by suppressing local temperature rise.

Figure 2:
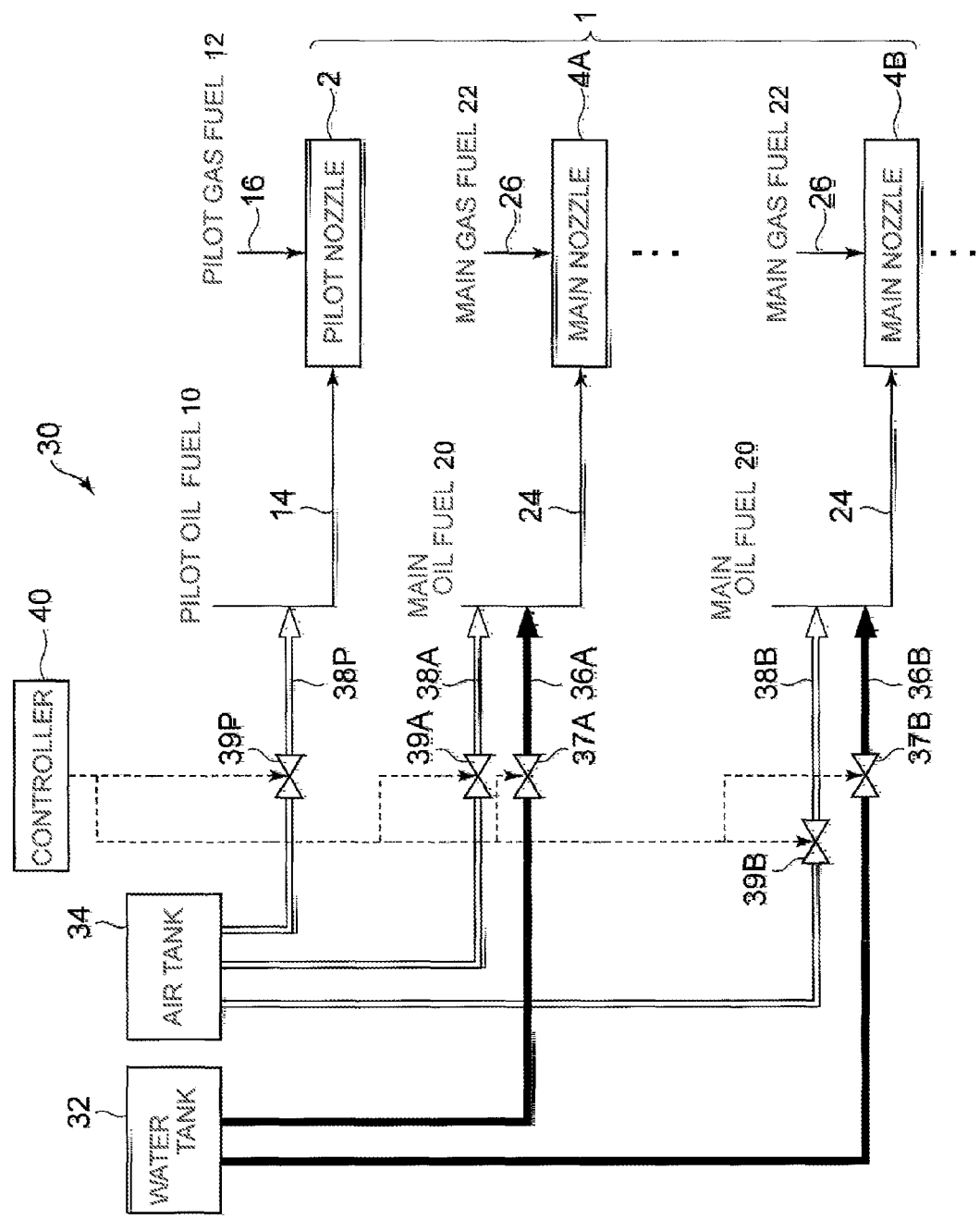
FIG. 2 is an illustration of an example of an overall structure of a purge unit for the dual-fuel type gas turbine combustor.

FIG. 2 is an illustration of an example of an overall structure of a purge unit for the combustor 1.

As illustrated in the drawing, a purge unit 30 is provided with a water tank 32, a purging water supply path 36 (36A, 36B), a purging water supply valve 37 (37A, 37B), an air tank 34, a purging air supply path 38 (38P, 38A, 38B), a purging air supply valve 39 (39P, 39A, 39B) and a controller 40.

Herein, the plurality of main nozzles 4 is divided into group A and group B, which is described later in details with reference to FIG. 3. The timing for starting water purging is varied between the groups. The main nozzle belonging to group A is referred to as main nozzle 4A, and the purging water supply path, the purging water supply valve, the purging air supply path and the purging air supply valve relating to the main nozzle 4A are indicated as 36A, 37A, 38A, and 39A, respectively. Similarly, the main nozzle belonging to group B is referred to as main nozzle 4B, and the purging water supply path, the purging water supply valve, the purging air supply path and the purging air supply valve relating to the main nozzle 4B are indicated as 36B, 37B, 38B, and 39B, respectively. Further, the purging air supply path and the purging air supply valve relating to the pilot nozzle 2 are indicated as 38P and 39P, respectively.

The water tank 32 stores water for purging. The water tank 32 is configured to communicate with the main oil fuel line 24 of each of the main nozzles 4A and 4B via the purging water supply path 36 (36A, 36B). Further, the purging water supply valves 37A and 37B corresponding to the main nozzles 4A and 4B are provided in the purging water supply paths 36A and 36B, respectively. Each of the purging water supply valves 37A and 37B is controlled to open and close by the controller 40.

The air tank 34 stores air for purging. The air tank 34 is configured to communicate with the oil fuel lines 14 and 24 of each nozzle 2, 4A, and 4B via the purging air supply path 38 (38P, 38A, 38B). Further, the purging air supply valves 39P, 39A, and 39B corresponding to the nozzles 2, 4A, and 4B are provided in the purging air supply paths 38P, 38A, and 38B, respectively. Each of the purging air supply valves 39P, 39A, and 39B is controlled to open and close by the controller 40.

Figure 3:
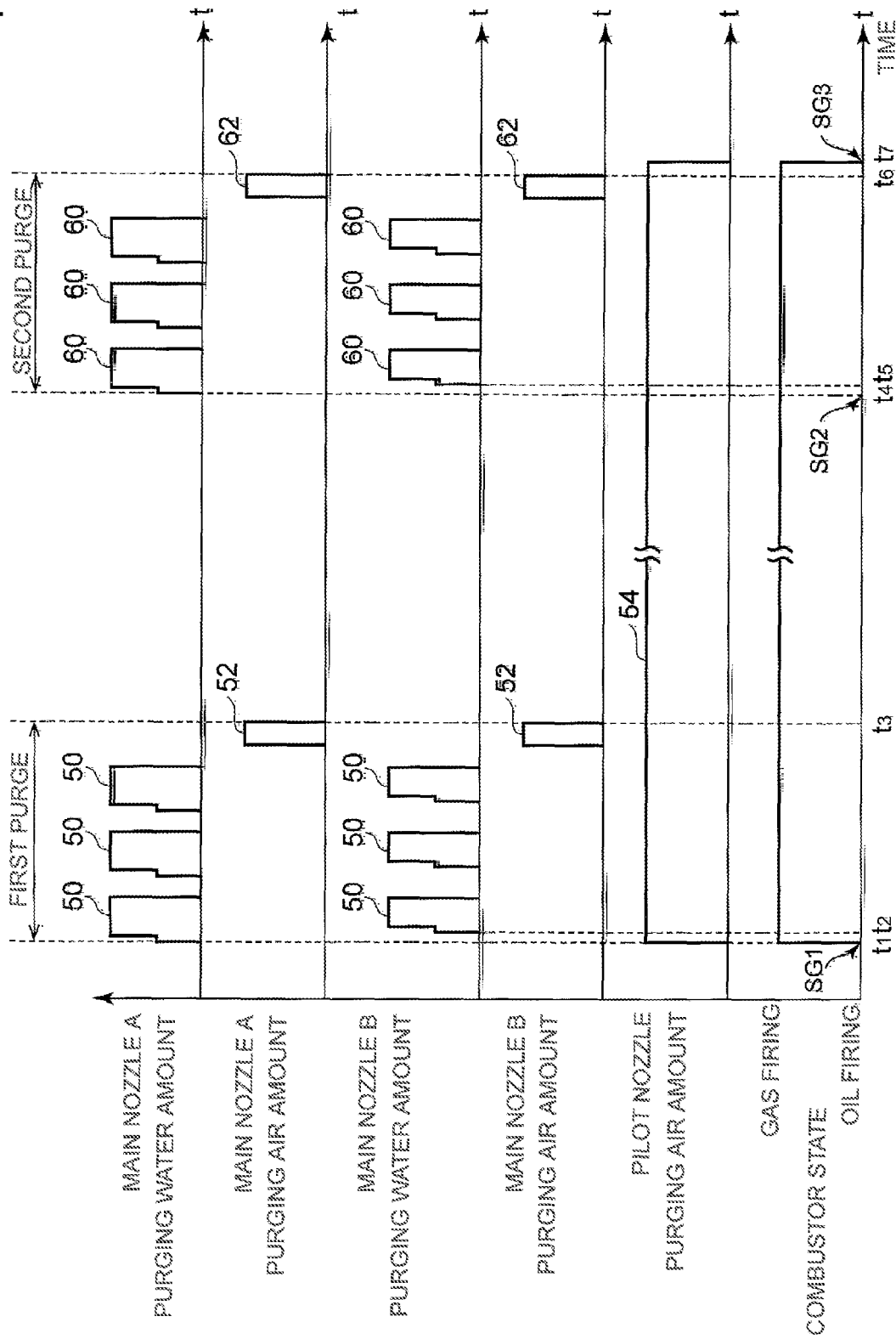
FIG. 3 is an example timing chart of water purging and air purging performed by the purge unit.

FIG. 3 is a timing chart of water purging and air purging performed by the purge unit 30. As illustrated in the drawing, at time t1, the operation state of the combustor 1 is switched to gas firing from oil firing and a signal SG1 indicating switching of the fuel to the gas fuel 12 and 22 from the oil fuel 10 and 20 is inputted to the controller 40.

The controller 40 controls opening and closing of the valves 37A, 37B, 39A, and 39B in response to the fuel switching signal SG1, and performs first purge for each of the main nozzles 4A and 4B immediately after the fuel is switched to the main gas fuel 22 (time t1-t3).

The first purge herein is a purge process including at least the water purging and may be a combination of the water purging and the air purging. For instance, as illustrated in FIG. 3, as the first purge, the water purging 50 may be performed more than one time (three times in the case of FIG. 3) followed by the air purging 52. As described above, by performing the air purging 52 after the water purging 50, mixture of the purging water and the residual oil (water contaminated with the residual oil after purging of the main oil fuel line 24) can be discharged from the main oil fuel line 24 so as to prevent moisture of the mixture from evaporating and leaving a significant amount of solidified matter in the main oil fuel line 24 during the gas firing operation of the combustor 1.

In the case where the first purge is formed by the combination of the water purging 50 and the air purging 52, during the water purging 50, the purging water supply valves (37A, 37B) are opened under the control of the controller 40 to supply the purging water to the main oil fuel line 24 from the water tank 32. The residual oil in the main oil fuel line 24 is discharged by the purging water. Similarly, during the air purging 52, the purging air supply valves (39A, 39B) are opened under the control of the controller 40 to supply the purging air to the main oil fuel line 24 from the air tank 34. The mixture of the purging water and the residual oil in the main oil fuel line 24 is discharged by the purging air.

Further, when performing the water purging 50 for each of the main oil fuel lines 24, the timing for starting the water purging 50 may be different between the groups A and B from the perspective of maintaining combustion stability. For instance, as illustrated in FIG. 3, for each of the main oil fuel lines 24 communicating with each of the main nozzles 4A belonging to group A, the water purging 50 may be started at time t1, whereas for each of the main oil fuel lines 24 communicating with each of the main nozzles 4B belonging to group B, the water purging 50 may be started at time t2.

In this manner, the water purging 50 is performed at different timings (t1, t2) for group A and group B in this manner, instead of performing at the same time for all the main oil fuel lines 24 in the first purge. Thus, it is easier to maintain combustion stability immediately after starting the water purging 50.

Further, in the case of performing the water purging 50 multiple times in the first purge, combustion stability is most likely to decline immediately after starting the first water purging 50. Thus, by varying the timings for starting a first one of the multiple times of the water purging 50 between group A and group B, it is possible to contribute to maintaining combustion stability. After the first time, the timings for starting the water purging may be the same for group A and group B. Alternatively, from the perspective of simplifying the control logic, the start timings of not only the first water purging but also of the subsequent water purging may be varied between group A and group B so as to standardize the timing chart of each time of the multiple times of the water purging 50 for each of group A and group B as illustrated in FIG. 3.

Further, when starting the water purging 50 for each of group A and group B, the amount of water used in each time of the water purging 50 may be increased in a phased manner (two phases in the case of FIG. 3) as illustrated in FIG. 3. By increasing the amount of water supplied to the main fuel oil line 24 in the water purging in a phased manner, it is easier to further maintain stable combustion immediately after the water purging 50 is started.

Furthermore, in the case of performing the water purging 50 multiple times in the first purge, combustion stability is most likely to decline immediately after the first water purging 50 is started. Thus, by increasing the purging water amount in a phase manner only when the first one of the multiple times of the water purging 50 is started, it is possible to contribute to maintaining combustion stability. Therefore, it is no longer necessary to increase the purging water amount in a phased manner at the beginning of the water purging after the first time. Alternatively, from the perspective of simplifying the control logic, the water purging amount may be increased in a phased manner not only at the beginning of the first purging but also of the subsequent water purging so as to standardize the timing chart of each of the multiple times of the water purging 50 for each of group A and group B as illustrated in FIG. 3.

Moreover, the controller 40 may control opening of a flow regulating valve provided in each of the pilot gas fuel line 16 and the main gas fuel lines 26 to temporarily increase the ratio (pilot ratio) of the fuel injection amount from the pilot nozzle 2 for diffusion combustion relative to the entire fuel flow during the water purging 50. As a result, it is easier to maintain combustion stability during the water purging 50. For instance, a ratio obtained by adding 1 to 5% to a base value, which is a pilot ratio of the case where the water purging 50 is not performed, may be used as a pilot ratio during the water purging 50.

The purging water amount Y supplied to the main oil fuel line 24 during the water purging 50 may be determined to be not greater than a flame extinction limit value Fth in accordance with gas turbine output X.

Figure 4:
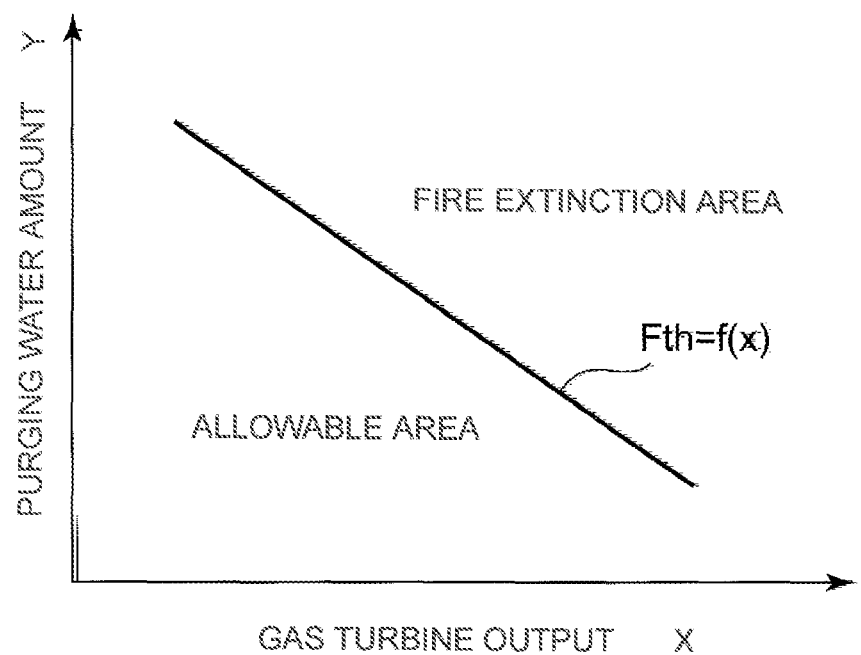
FIG. 4 is a graph showing an example of correlation between a gas turbine output and a flame extinction limit value of a purging water amount.

In the amount of the purging water supplied during the water purging 50, there is the flame extinction limit value Fth for maintaining stable combustion without causing flame extinction. Further, this flame extinction limit value Fth relies on the gas turbine output X. More specifically, as illustrated in FIG. 4, the flame extinction limit value is represented by Fth=f(X). Thus, by setting the purging water amount of the water purging 50 not greater than the flame extinction limit value Fth (within an allowable area of FIG. 4) in accordance with the gas turbine output X, it is possible to select an appropriate amount of the water for the water purging 50 in accordance with the gas turbine output X within a range that does not interfere with stable combustion, thereby surely removing the residual oil from the main oil fuel line 24. Further, the amount of water supplied during the water purging 50 may be set, for instance, in a range from 0.5Fth or more to 0.98Fth or less (preferably 0.8Fth or more to 0.95Fth or less) from the perspective of achieving both the stable combustion and removal of the residual oil.

After the first purge is completed at time t3 and until a preparation signal SG2 for switching the fuel from the gas fuel 12 and 22 to the oil fuel 10 and 20 is inputted to the controller 40 at time t4 as illustrated in FIG. 3, it is not necessary to perform purging for each of the main nozzles 4A and 4B. Alternatively, from the perspective of surely discharging the residual oil from the main oil fuel line 24, separately from the second purge which is described later, a third purge may be additionally performed manually or automatically at an arbitrary timing in a period between time t3 and time t4. For instance, in the period t3-t4, the third purge of content similar to the first purge may be additionally performed after every prescribed period of time. For instance, every time that the prescribed period of time passes, the controller 40 may control opening and closing of the valve 37A, 37B, 39A, and 39B in response to the a signal inputted to the controller 40, so as to perform the third purge for each of the main nozzles 4A and 4B in the period t3-t4.

Most of the residual oil fuel can be discharged from the main oil fuel line 24 by performing the first purge. However, it is practically difficult to completely remove the oil fuel by the first purge alone and at least some oil fuel remains in the main oil fuel line 24 after the first purge. Particularly, in the oil fuel distribution passage (see FIG. 1) as well as in the oil sump 25 in the main nozzle 4 of the main oil fuel line 24, the oil fuel tends to remain. Further, a small amount of the residual oil fuel in the main oil fuel line 24 that could not be removed by the first purge is exposed to the high temperature environment following immediately after the operation is switched to the gas firing operation (after time t1) and turns into a high-viscosity substance. It is difficult to remove the high-viscosity substance by repeating the first purge in this state.

Therefore, when the preparation signal SG2 for switching the fuel is inputted to the controller 40 at time t4, the controller 40 controls opening and closing of the valve 37A, 37B, 39A, and 39B in response to the signal SG2 so as to perform the second purge for each of the main nozzles 4A and 4B immediately before the injection fuel is switched to the main oil fuel 20 from the main gas fuel 22 (time t4-t6).

Herein, the second purge refers to a purging process including at least the water purging and may be a combination of the water purging and the air purging. Further, for the perspective of simplifying the control logic, the second purge may have the same content as the first purge.

For instance, as illustrated in FIG. 3, as the second purge, the water purging 60 may be performed multiple times (three times in the case of FIG. 3) followed by the air purging 62. As described above, by performing the air purging 62 after the water purging 60, the residual oil (solidified matter or semi-solidified matter) in the main oil fuel line 24 is removed by the water purging 60 and then, the water remaining in the main oil fuel line 24 (the water which is used for purging the residual oil and is contaminated with the residual oil) is discharged by the air purging 62. Moreover, by completing the water purging 60 and the air purging 62 before the injection fuel is switched to the main oil fuel 20 from the main gas fuel 22 (before time t7), it is possible to start the oil firing operation in such a state that there is no purging water remaining in the main oil fuel line 24. Thus, it is possible to prevent inhibition of stable combustion in the initial stage of the oil firing operation caused by the water remaining in the main oil fuel line 24 (the water used for purging the residual oil) being injected at once.

In the case where the second purge is formed by the combination of the water purging 60 and the air purging 62, during the water purging 60, the purging water supply valves (37A, 37B) are opened under the control of the controller 40 to supply the purging water to the main oil fuel line 24 from the water tank 32. The residual oil in the main oil fuel line 24 is discharged by the purging water. Similarly, during the air purging 62, the purging air supply valves (39A, 39B) are opened under the control of the controller 40 to supply the purging air to the main oil fuel line 24 from the air tank 34. The mixture of the purging water and the residual oil in the main oil fuel line 24 is discharged by the purging air.

Further, when performing the water purging 60 in each of the main oil fuel lines 24, the timing for starting the water purging 60 may be different between the groups A and B from the perspective of maintaining the combustion stability. For instance, as illustrated in FIG. 3, for each of the main oil fuel lines 24 communicating with each of the main nozzles 4A belonging to group A, the water purging 60 may be started at time t4, whereas for each of the main oil fuel lines 24 communicating with each of the main nozzles 4B belonging to group B, the water purging 60 may be started at time t5.

By performing the water purging 60 at different timings (t4, t5) for group A and group B of the main nozzles 4 in this manner, instead of performing the water purging 60 in the second purge for all the main oil fuel lines 24 at the same time, it is easier to maintain combustion stability immediately after starting the water purging 60.

Further, in the case of performing the water purging 60 multiple times in the second purge, combustion stability is most likely to decline immediately after starting the first water purging 60. Thus, by varying the timings for starting a first one of the multiple times of the water purging 60 between group A and group B, it is possible to contribute to maintaining combustion stability. Therefore, the timings for starting the water purging after the first time may be the same for group A and group B. Alternatively, from the perspective of simplifying the control logic, the start timings of not only the first water purging but also of the subsequent water purging may be varied between group A and group B so as to standardize the timing chart of each time of the water purging 60 for each of group A and group B as illustrated in FIG. 3.

Further, at the beginning of the water purging 60 for each of group A and group B, the amount of water used in each time of the water purging 60 may be increased in a phased manner (two phases in the case of FIG. 3) as illustrated in FIG. 3. In this manner, by increasing the amount of water supplied to the main oil fuel line 24 in the water purging 60 in a phased manner, it is easier to further maintain stable combustion immediately after starting the water purging 60.

Furthermore, in the case of performing the water purging 60 multiple times in the first purge, the combustion stability is most likely to decline immediately after starting the first water purging 60. Thus, by increasing the purging water amount in a phase manner only at the beginning of the first one of the multiple times of the water purging 60, it is possible to contribute to maintaining the combustion stability. Therefore, it is not necessary to increase the purging water amount in a phased manner at the beginning of the water purging after the first time. Alternatively, from the perspective of simplifying the control logic, the purging water amount may be increased in a phased manner at the beginning of not only the first water purging but also of the subsequent water purging so as to standardize the timing chart of each of the multiple times of the water purging 60 for each of group A and group B as illustrated in FIG. 3

Moreover, the controller 40 may control opening of a flow regulating valve provided in each of the pilot gas fuel line 16 and the main gas fuel lines 26 to temporarily increase the pilot ratio during the water purging 60. As a result, it is easier to maintain combustion stability during the water purging 60. For instance, a ratio obtained by adding 1 to 5% to a base value, which is a pilot ratio of the case where the water purging 60 is not performed, may be used as a pilot ratio during the water purging 60.

Similarly to the amount of water used in the water purging 50 of the first purge, the purging water amount Y supplied to the main oil fuel line 24 during the water purging 60 in the second purge may be determined to be not greater than the flame extinction limit value Fth in accordance with the gas turbine output X. For instance, the amount of water supplied during the water purging 60 may be set in a range from 0.5 Fth or more to 0.98 Fth or less (preferably 0.8 Fth or more to 0.95 Fth or less) from the perspective of achieving both the stable combustion and removal of the residual oil.

The first purge and the second purge are performed for the main nozzles 4A and 4B in the above manner. On the other hand, air purging 54 may be performed continuously for the pilot nozzle 2 during the gas firing operation (time t1-t7) as illustrated in FIG. 3. This is because the pilot nozzle 2 is surrounded by the plurality of the main nozzles 4A and 4B and hence the temperature of the pilot nozzle 2 tends to be higher than the temperature of the main nozzles 4A and 4B and particularly coking of the residual oil tends to occur in the pilot nozzle 2. During the gas firing operation, by performing the air purging 54 in a continuous manner, it is possible to effectively prevent coking of the residual oil in the pilot oil fuel line 14.

Further, when a signal SG3 indicating switching of the fuel to the oil fuel (10, 20) from the gas fuel (12, 22) is inputted to the controller 40 at time t7, the air purging 54 for the pilot oil fuel line 14 is finished.

Figure 5:
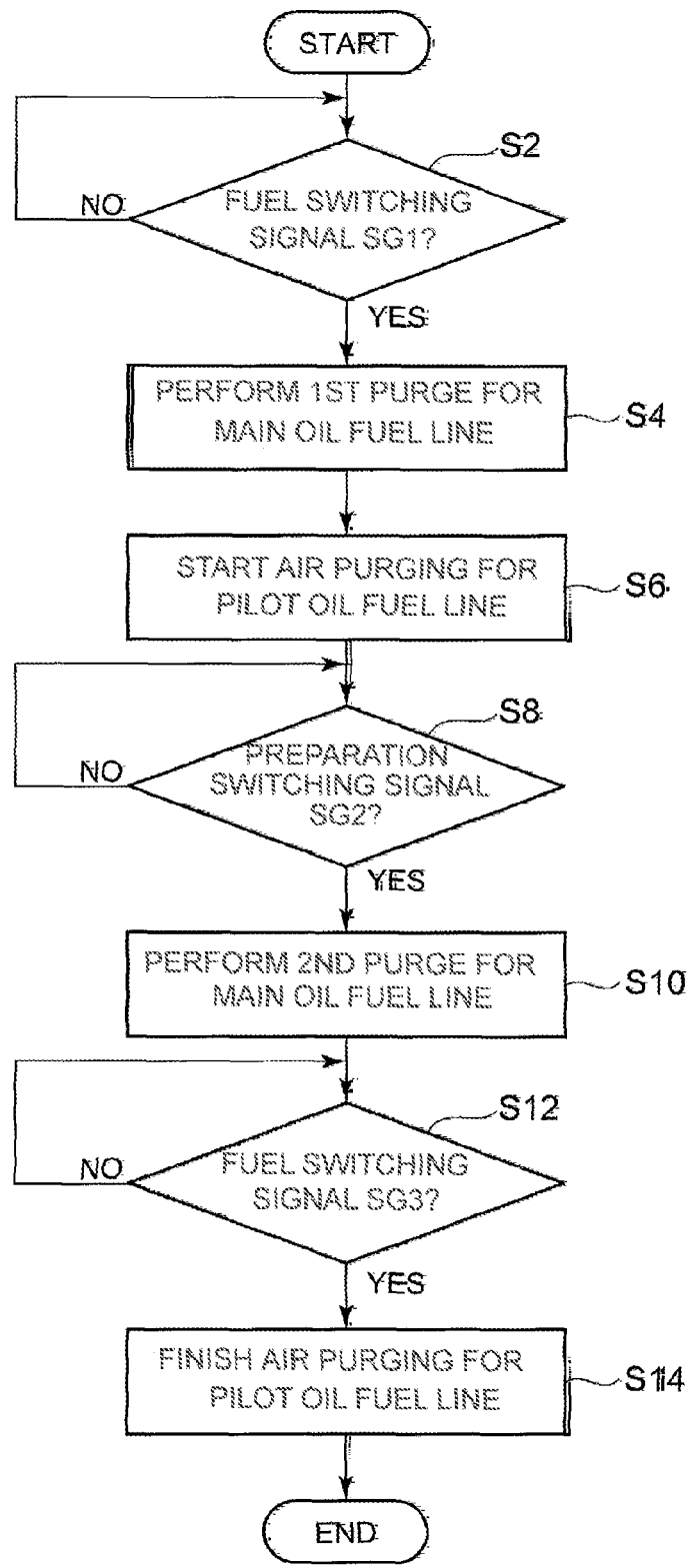
FIG. 5 is a flow chart illustrating a process example of a purging method for the gas turbine combustor.

FIG. 5 is a flow chart illustrating a process of a purging method for the combustor according to this embodiment. This flow chart shows the purging method in the period from the time when the oil firing operation of the combustor 1 is performed to the time when the operation of the combustor 1 is switched back to the oil firing operation after the operation of the combustor 1 is switched to the gas firing operation.

As illustrated in FIG. 5, it is determined whether or not the signal SG1 for switching the operation of the combustor 1 to the gas firing operation from the oil firing operation is inputted to the controller 40 (step S2). This step S2 is repeated until the fuel switching signal SG1 is inputted to the controller 40. Then, in the case where the switching signal SG1 is inputted to the controller 40 (YES in step S2), the process advances to step S4 where the controller 40 controls opening and closing of the valves 37A, 37B, 39A, and 39B to perform the first purge for each of the main nozzles 4A and 4B immediately after the fuel is switched to the main gas fuel 22 (time t1-t3 in the example of FIG. 3). Further, for the pilot oil fuel line 14, the air purging 54 is started by controlling opening and closing of the valve 39P under the control of the controller 40 (step S6).

Then, it is determined whether or not the preparation signal SG2 for switching the operation from the gas firing operation to the oil firing operation is inputted to the controller 40 (step S8). This step S8 is repeated until the preparation signal SG2 is inputted to the controller 40. Then, in the case where the preparation signal SG2 is inputted to the controller 40 (YES in step S8), the process advances to step S10, and by controlling opening and closing of the valves 37A, 37B, 39A, and 39B under the control of the controller 40, the second purge is performed for each of the main nozzles 4A and 4B immediately before the injection fuel is switched to the main oil fuel 20 from the main gas fuel 22 (time t4-t6 in the example of FIG. 3).

Next, it is determined whether the signal SG3 for switching the operation of the combustor 1 to the oil firing operation from the gas firing operation is inputted to the controller 40 (step S12). This step S12 is repeated until the signal SG3 is inputted to the controller 40. Then, in the case where the signal SG3 is inputted to the controller 40 (YES in step S12), the air purging 54 for the pilot oil fuel line 14 which is started in step S6 is finished (step S14).

As described above, according to this embodiment, most of the liquid oil fuel remaining in the main oil fuel line 24 is removed by performing the first purge immediately after the injection fuel is switched to the main gas fuel 22 from the main oil fuel 20 (time t1-t3). However, it is practically difficult to completely remove the oil fuel by the first purge alone. For instance, at least a small amount of the oil fuel remains in a stagnation part of the flow in the main oil fuel line 24. Further, the small amount of the oil fuel that could not be removed by the first purge and remained in the main oil fuel line 24 is exposed to the high temperature environment immediately after the operation is switched to the gas firing operation and turns into a high-viscosity substance. It is difficult to remove the high-viscosity substance even by repeating the purge (the first purge) in this state.

In contrast, at the time of performing the second purge (immediately before the injection fuel is switched to the main oil fuel 20 from the main gas fuel 22), the small amount of the high-viscosity substance has been already exposed to the high temperature environment caused by the gas firing operation for a long time (typically a few days to a few weeks) and drying of the substance already progressed to turn the high-viscosity substance into the solidified matter (or semi-solidified matter). Further, at this time, as the main oil fuel 20, which draws heat from the main oil fuel line 24, has not streamed in the main oil fuel line 24 for a long time after the operation is switched to the gas firing operation, the main oil fuel line 24 is already at high temperature not less than the boiling point of water. When the second purge is started in this state, a part of purging water introduced to the main oil fuel line 24 of high temperature evaporates, generating water vapor in an initial stage of the second purge (near time t4). This water vapor causes the small amount of the high-viscosity substance turned into the solidified matter (or semi-solidified matter) to be lifted and separated from a wall surface inside the main oil fuel line 24, and the separated solidified matter (or semi-solidified matter) is then discharged with the purging water introduced afterwards from the main oil fuel line 24. In this process, the purging water (or water vapor) heated to high temperature by heat transfer from the heat retained by the main oil fuel line 24 contacts the high-viscosity substance turned into the solidified matter (or semi-solidified matter), thereby hydrolyzing the solidified matter (or semi-solidified matter). It is presumed that separation and discharge of the solidified matter (or semi-solidified matter) from the main oil fuel line 24 is promoted in this manner.

By combining the first purge and the second purge of two different purge mechanisms, it is possible to surely remove the residual oil from the main oil fuel line 24 and to effectively prevent deviation of the exhaust gas environmental regulation value from the regulation range.

At the time when the first purge is performed (i.e. immediately after the injection fuel is switched to the main gas fuel 22 from the main oil fuel 20), the temperature of the main oil fuel line 24 is not so high as the main oil fuel 20 was streaming in the main oil fuel line 24 until just before the first purge and heat transfer was taking place from the main oil fuel line 24 to the main oil fuel 20. Therefore, it is presumed that in the first purge, unlike the second purge, generation of the water vapor from the purging water and contact with the high temperature water or the water vapor causes little hydrolysis of the solidified matter (or semi-solidified matter).

According to this embodiment, it is possible to avoid failures such as blockage of the nozzles 4A and 4B and deviation of the fuel injection amount from the desired value which result from the residual oil. Therefore, it is fundamentally no longer necessary to remove the nozzle from the combustor 1 to clean. As a result, it is possible to avoid missing a power generation opportunity due to the operation shutdown of the gas turbine for cleaning the nozzle. Further, it is fundamentally no longer necessary to prepare a spare nozzle in case of operating the gas turbine during the nozzle cleaning.

While the embodiments of the present invention have been described, it is obvious that various modifications and changes may be made without departing from the scope of the invention.

For instance, in the above embodiment, the example illustrated in FIG. 3 is described regarding the specific contents of the first purge and the second purge for each of the main nozzles 4A and 4B. However, the specific contents of the first purge and the second purge are not particularly limited as long as the first purge for purging by at least water immediately after the injection fuel is switched to the gas fuel from the oil fuel and the second purge for purging by at least water immediately before the injection fuel is switched to the oil fuel from the gas fuel are performed on the oil fuel line of at least one of the nozzles. For instance, the amount of the purging water of the water purging 50 and 60 or the amount of the purging air of the air purging 52 and 62, a pressure of the purging water or the purging air, the purging time, the number of purging times, etc. may be adjusted to get the maximum cleaning effect of purging.

Further, in the above embodiment, the first purge and the second purge include the air purging 52 and 62. However, this is not limitative and instead of the air purging 52 and 62, gas purging may be performed to supply gas of an arbitrary type other than the air (e.g. inert gas such as nitrogen gas and argon gas) into each of the main nozzles 4A and 4B. The particular conditions of performing the gas purging may be similar to those of the air purging 52 and 62.

Furthermore, in the above embodiment, the combustor 1 is provided with the pilot nozzle 2 and the main nozzles 4A and 4B. However, the configuration of the combustor 1 is not limited to this. For instance, the combustor 1 may have nozzles of one type. In this case, when purging the nozzles of the one type, the first purge for purging by at least water immediately after the injection fuel is switched to the gas fuel from the oil fuel and the second purging for purging by at least water immediately before the injection fuel is switched to the oil fuel from the gas fuel may be performed.

[Working Example]

The following experiments were made to study the effect of the purging method for the combustor according to the above embodiment on the exhaust gas environmental regulation value. More specifically, for the gas turbine equipped with the dual-fuel type combustor 1, three types of purge processes, Working Example, Comparison Example 1 and Comparison Example 2 were performed, and content in the exhaust gas was analyzed and exhaust gas CO concentration [ppm] at standard O2 concentration 15% was obtained. The details of each purging method are described below. Since there was variation in the results of CO concentration analysis, data regarding the results of the CO concentration analysis was collected by repeating multiple times the purging process under the conditions of Working Example, Comparison Example 1 and Comparison Example 2 and then analyzing the exhaust gas CO concentration.

The conditions of the purging process in Working Example, Comparison Example 1 and Comparison Example 2 are as follows.

In Working Example, the first purge and the second purge shown in FIG. 3 are both performed. More specifically, immediately after the injection fuel is switched to the main gas fuel 22 from the main oil fuel 20 (time t1-t3), the first purge is performed for each of the main nozzles 4A and 4B. Further, immediately before the injection fuel is switched to the main oil fuel 20 from the main gas fuel 22 (time t4-t6), the second purge is performed for each of the main nozzles 4A and 4B. In each of the first purge and the second purge, as illustrated in the example of FIG. 3, the water purging 50 and 60 is performed three times and then the air purging 52 and 62 is performed one time. Further, in each water purging 50 and 60, the purging water flow rate is 24,000 lb/h and the water purging time is ten minutes.

In Comparison Example 1, only the first purge shown in FIG. 3 is performed. The specific content of the first purge is the same as that of Working Example. Further, in Comparison Example 2, only the second purge shown in FIG. 3 is performed. The specific content of the second purge is the same as that of Working Example.

Figure 6:
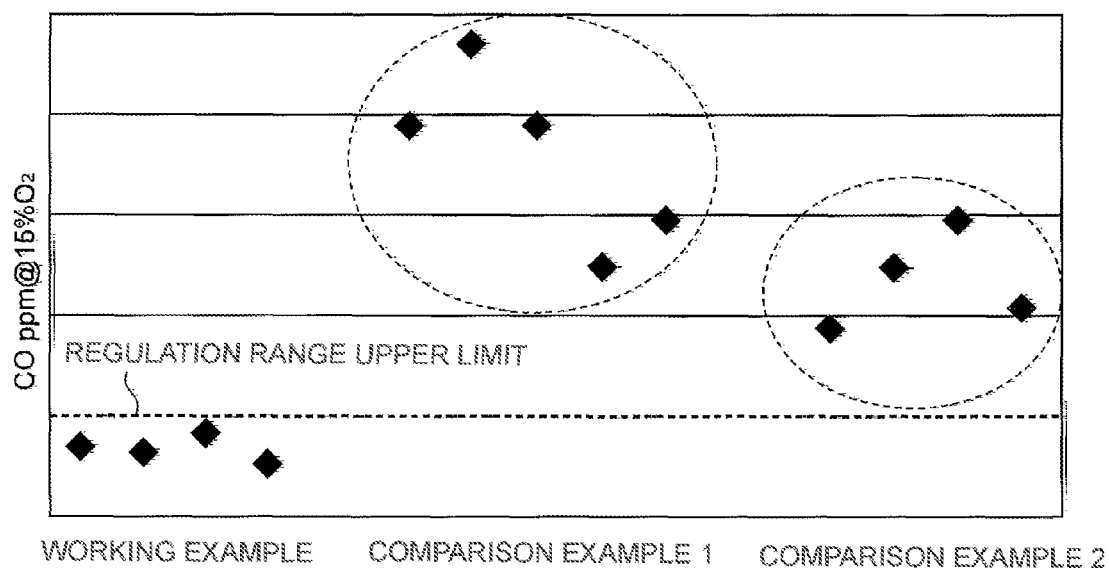
FIG. 6 is a graph illustrating analysis results of exhaust gas CO concentration regarding Working Example, Comparison Example 1 and Comparison Example 2.

FIG. 6 is a graph illustrating analysis results of exhaust gas CO concentration regarding Working Example, Comparison Example 1 and Comparison Example 2. As is clear from the graph, in Working Example with both the first purge and the second purge being preformed, the exhaust gas CO concentration never exceeds an upper limit of the regulation range. On the other hand, in Comparison Example 1 and Comparison Example 2 with only one of the first purge or the second purge being performed, the variation of the exhaust gas CO concentration is wide and never within the regulation range.

Therefore, it is confirmed that deviation of the exhaust gas environmental regulation value from the regulation range can be effectively prevented by surely removing the residual oil from the oil fuel line with the combination of the first purge step of purging immediately after the fuel is switched to the gas fuel and the second purge step of purging immediately before the fuel is switched to the oil fuel.

In Comparison Example 1 of performing only the first purge, the variation of the exhaust gas CO concentration was wide and never within the regulation range. The reason for this is considered to be that the residual oil was not completely removed from the oil fuel line by the first purge alone, causing failures in the combustor such as blockage of the nozzle and deviation of the fuel injection amount from the desired value.

Further, in Comparison Example 2 of performing only the second purge, the variation of the exhaust gas CO concentration was wide and never within the regulation range. The reason for this is considered to be as follows. The large amount of the oil fuel remaining in the oil fuel line when the operation is switched to the gas firing operation from the oil firing operation, becomes exposed to the high temperature environment for a long period of time during the gas firing operation, causing coking thereof and adhesion to the wall surface inside the oil fuel line progresses. The residual oil (solidified matter) cannot be completely removed by the second purge alone, causing the failures such as the blockage of the nozzle and deviation of the fuel injection amount from the desired value.

The invention claimed is:

1. A purging method for a gas turbine combustor comprising a nozzle which communicates with an oil fuel line where oil fuel flows and a gas fuel line where gas fuel flows and for which injection fuel is switched between the oil fuel and the gas fuel, the method comprising:
   a first purge step of purging the oil fuel line by at least water immediately after the injection fuel is switched to the gas fuel from the oil fuel; and a second purge step of purging the oil fuel line by at least water immediately before the injection fuel is switched to the oil fuel from the gas fuel.

2. The purging method for the gas turbine combustor according to claim 1,
wherein the second purge step is performed before the injection fuel is switched to the oil fuel from the gas fuel, in response to a preparation signal for switching the injection fuel to the oil fuel from the gas fuel.

3. The purging method for the gas turbine combustor according to claim 1,
wherein, in the second purge step, water purging is performed by supplying water to the oil fuel line and then gas purging is performed by supplying gas to the oil fuel line, and
wherein the water purging and the gas purging are completed before the injection fuel is switched to the oil fuel from the gas fuel.

4. The purging method for the gas turbine combustor according to claim 1,
wherein the nozzle includes: a pilot nozzle which communicates with a pilot oil fuel line and a pilot gas fuel line and for which the injection fuel is switchable between the oil fuel and the gas fuel; and a plurality of main nozzles which is provided to surround the pilot nozzle, each of the plurality of main nozzles communicating with a main oil fuel line and a main gas fuel line and being configured to switch the injection fuel between the oil fuel and the gas fuel,
wherein the oil fuel line purged by the at least water in the first purge step and the second purge step is the main oil fuel line communicating with each of the plurality of main nozzles,
wherein, in the second purge step, water purging is performed by supplying water to the main oil fuel line and then gas purging is performed by supplying gas to the main oil fuel line, and
wherein, when the gas fuel is selected as the injection fuel, only gas purging is performed in the pilot oil fuel line by supplying gas to the pilot oil fuel line in a continuous manner.

5. The purging method for the gas turbine combustor according to claim 4,
wherein the plurality of main nozzles is divided into groups, and
wherein the water pinging in the second purge step is started for the main oil fuel lines communicating with the plurality of main nozzles belonging to the groups at timings that differ according to the groups.

6. The purging method for the gas turbine combustor according to claim 5,
wherein when starting the water purging in the second purge step, an amount of the water supplied to the main oil fuel line communicating with the main nozzle belonging to each of the groups is increased in a phased manner.

7. The purging method for the gas turbine combustor according to claim 4,
wherein, while supplying the water to the oil fuel line in the first purge step and the second purge step, a pilot ratio is temporarily increased, the pilot ratio being a ratio of a flow of fuel injected from the pilot nozzle to an entire fuel flow.

8. The purging method for the gas turbine combustor according to claim 1,
wherein, in the first purge step and the second purge step, an amount of the water supplied to the oil fuel line for purging the oil fuel line is set not greater than a flame extinction limit value in accordance with an output of a gas turbine.

9. A purge unit for a gas turbine combustor comprising a nozzle which communicates with an oil fuel line where oil fuel flows and a gas fuel line where gas fuel flows and for which injection fuel is switchable between the oil fuel and the gas fuel, the purge unit comprising:
a water tank for reserving water for purging;
a purging water supply path for communicating the water tank with the oil fuel line;
a purging water supply valve provided in the purging water supply path; and
a controller for controlling opening and closing of the purging water supply valve,
wherein the controller is configured to:
supply water to the oil fuel line from the water tank by opening the purging water supply valve in response to a signal for switching the injection fuel to the gas fuel from the oil fuel so as to perform a first purging of the oil fuel line immediately after the injection fuel is switched to the gas fuel; and
supply water to the oil fuel line from the water tank by opening the purging water supply valve in response to a preparation signal for switching the injection fuel to the oil fuel from the gas fuel so as to perform a second purging of the oil fuel line immediately before the injection fuel is switched to the oil fuel from the gas fuel.

* * * * *